(12) United States Patent
Ueno et al.

(10) Patent No.: US 10,866,123 B2
(45) Date of Patent: Dec. 15, 2020

(54) ROTATION DETECTING DEVICE AND HOLLOW ACTUATOR

(71) Applicant: HARMONIC DRIVE SYSTEMS INC., Tokyo (JP)

(72) Inventors: Shintaro Ueno, Azumino (JP); Ryutaro Yamaguchi, Azumino (JP); Kiyoto Kobayashi, Azumino (JP); Keisuke Takewaka, Azumino (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 148 days.

(21) Appl. No.: 16/306,643

(22) PCT Filed: Jun. 10, 2016

(86) PCT No.: PCT/JP2016/067449
§ 371 (c)(1),
(2) Date: Dec. 3, 2018

(87) PCT Pub. No.: WO2017/212654
PCT Pub. Date: Dec. 14, 2017

(65) Prior Publication Data
US 2019/0301898 A1    Oct. 3, 2019

(51) Int. Cl.
*G01D 5/245*     (2006.01)
*H02K 11/215*    (2016.01)
(Continued)

(52) U.S. Cl.
CPC ............. *G01D 5/245* (2013.01); *G01D 5/147* (2013.01); *G01D 5/2458* (2013.01);
(Continued)

(58) Field of Classification Search
CPC ........ G01D 5/147; G01D 5/145; G01D 5/245; G01D 5/24433; G01D 5/24442; G01D 105/24433; H02K 11/215; H02K 2211/03
See application file for complete search history.

(56) References Cited

U.S. PATENT DOCUMENTS

2009/0039872 A1* 2/2009 Fischer .................. G01D 5/245
324/207.13
2010/0045271 A1* 2/2010 Tanaka .................. G01D 5/145
324/207.13
(Continued)

FOREIGN PATENT DOCUMENTS

JP    H03-33982 U    4/1991
JP    2012-068049 A  4/2012
(Continued)

OTHER PUBLICATIONS

International Search Report (PCT/ISA/210) dated Aug. 16, 2016, by the Japan Patent Office as the International Searching Authority for International Application No. PCT/JP2016/067449.
(Continued)

*Primary Examiner* — Huy Q Phan
*Assistant Examiner* — Dustin R Dickinson
(74) *Attorney, Agent, or Firm* — Buchanan Ingersoll & Rooney PC

(57) ABSTRACT

A hollow type rotation detecting device has a 2-pole magnet ring and a multi-pole gear, the 2-pole magnet being coaxially fixed to the outer circumferential surface of the shaft end part of a hollow motor shaft that extends coaxially inside a cylindrical cover. In an annular gap between the cylindrical cover and the 2-pole magnet ring and multi-pole gear, rigid boards are arranged with an orientation facing in a tangential direction at prescribed intervals along the circumferential direction. The rigid boards are electrically connected to one another by flexible printed wiring boards. It is possible to
(Continued)

obtain a rotation detecting device suitable to be incorporated into the narrow annular gap between a motor house and the shaft end part of the hollow motor shaft in a hollow motor having a large hollow diameter.

6 Claims, 3 Drawing Sheets

(51) Int. Cl.
    *G01D 5/14*     (2006.01)
    *G01D 5/244*     (2006.01)

(52) U.S. Cl.
    CPC ....... *G01D 5/24433* (2013.01); *H02K 11/215* (2016.01); *H02K 2211/03* (2013.01)

(56) References Cited

U.S. PATENT DOCUMENTS

| 2012/0229127 A1* | 9/2012 | Koto | G01D 5/2452 |
| | | | 324/207.25 |
| 2013/0093415 A1* | 4/2013 | Moldenhauer | G01P 3/00 |
| | | | 324/207.25 |
| 2015/0268312 A1* | 9/2015 | Rivas | G01R 33/09 |
| | | | 324/251 |

FOREIGN PATENT DOCUMENTS

| JP | 2014-062770 A | 4/2014 |
| WO | 2011/061794 A1 | 5/2011 |

OTHER PUBLICATIONS

Written Opinion (PCT/ISA/237) dated Aug. 16, 2016, by the Japan Patent Office as the International Searching Authority for International Application No. PCT/JP2016/067449.

* cited by examiner

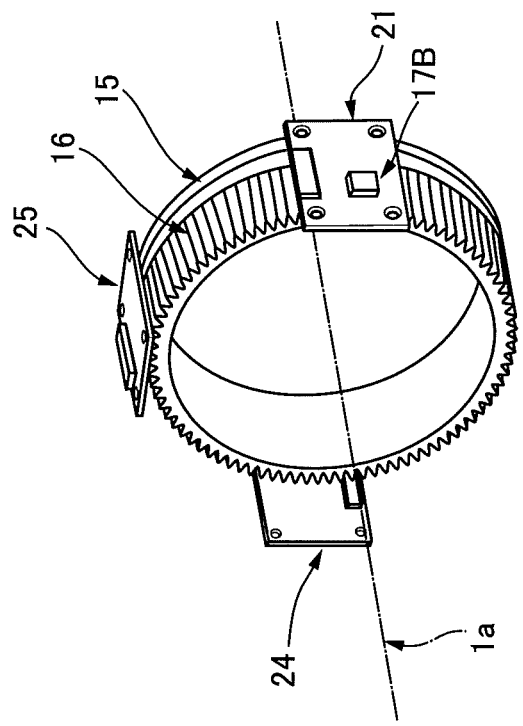
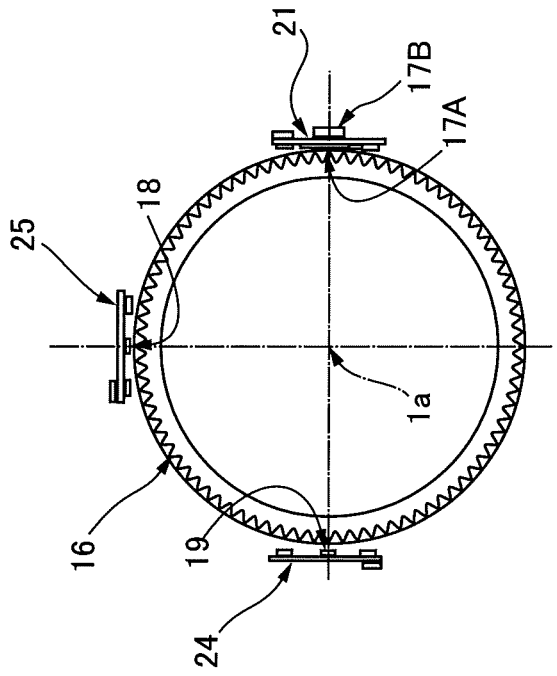
FIG. 2(a)
FIG. 2(b)

ROTATION DETECTING DEVICE AND HOLLOW ACTUATOR

TECHNICAL FIELD

The present invention relates to a rotation detecting device having a structure suitable to be incorporated into a hollow actuator with a large inner diameter.

BACKGROUND ART

There is known a magnetic encoder, for example, as a rotation detecting device for detecting rotational positions et al of a motor. Patent document 1 has proposed a hollow motor to which a magnetic encoder is attached. In the magnetic encoder disclosed in Patent document 1, a flexible printed wiring board for an encoder is arranged in a loop state along the annular end face of an annular base plate at the shaft end part of a hollow motor, and magnetic detection elements are implemented on the surface of the board. In addition, a fan-shaped signal processing circuit board for encoder (an IF board) is mounted on the shaft end part of the hollow motor so as to surround the hollow part thereof.

PRIOR ART DOCUMENT

Patent Document

Patent document 1: JP 2012-68049 A (FIGS. 1, 3 and 4)

SUMMARY OF THE INVENTION

Problems to be Solved by the Invention

There is a case in which a large hollow part is required for wiring or other purposes in a hollow motor or a hollow actuator having a hollow motor and a hollow speed reducer (which will be collectively referred to as a hollow actuator hereinafter). There is also a case in which enlargement of a hollow part is required without increasing the outer diameter due to restriction of installation space or the like.

In such cases, an installation space, in which a motor encoder or other rotation detecting device for detecting rotational positions or rotational numbers is installed, is also restricted. This means that a rotation detecting device must be incorporated into a narrow annular gap between the hollow part of an actuator and the device housing thereof.

For the purpose that the component parts of a rotation detecting device be incorporated into a narrow annular installation space, it is usually adopted such a scheme as simplifying circuit configuration of a rotation detecting device or mounting component parts with high density to reduce necessary installation space. However, the former scheme may arise a problem in some cases that necessary functions cannot be fulfilled, and the latter one may lead to a problem of cost increase.

As is described in Patent document 1, it is possible for encoder component parts to be disposed within a narrow annular installation space efficiently by routing a flexible printed wiring board into an annular shape and implementing magnetic detection elements on the surface thereof. However, since detection elements such as magnetic detection elements must be disposed at plural locations at a 90° or another angular interval, the cable length of a flexible printed wiring board becomes too short or too long when it is use in a hollow actuator having a different size. It is therefore necessary to manufacture a wiring board having a length suitable for each type of motor, which sometimes leads to cost increase.

In view of the above, an object of the present invention is to provide a rotation detecting device which is suitable to be incorporated into a narrow annular gap in the outer periphery of the hollow part of a hollow actuator, and is to provide a hollow actuator provided with the above rotation detecting device.

Means of Solving the Problems

In order to solve the above problems, a rotation detecting device of the present invention has:
a rotational body coaxially fixed to an outer circumferential surface of a hollow rotational shaft to be detected;
a cylindrical cover surrounding the rotational body;
an annular gap formed between an outer circumferential surface of the rotational body and an inner circumferential surface of the cylindrical cover;
a plurality of rigid boards arranged in the annular gap along a circumferential direction of the annular gap; and
a plurality of conductive members for electrically connecting the rigid boards in the annular gap,
wherein the rigid boards are respectively arranged in a state extending along a tangential direction with respect to the outer circumferential surface of the rotational body; and
the rigid boards include a plurality of detection-element implemented boards in which detection elements for detecting a rotational state (such as a rotational position, rotational speed, rotational number or the like) of the rotational body are implemented.

The rotation detecting device is assembled in the outer periphery of the hollow motor shaft of the hollow motor and is used to detect the rotational position or other rotational state of the hollow motor shaft, for example. In this case, the cylindrical cover is coaxially attached to the axial end of a motor housing, or instead the end portion of the motor housing is used as the cylindrical cover. The rotational body is coaxially attached to the outer circumferential surface of the shaft end part of the hollow motor shaft.

A hollow motor, in which a large hollow part is formed and at the same time the outer diameter dimension is restricted, has a narrow annular gap between the outer circumferential surface of the rotational body and the inner circumferential surface of the cylindrical cover. In the present invention, a plurality of rigid boards in which detection elements are implemented are arranged in the annular gap along the circumferential direction thereof and are electrically connected to one another by means of the conductive members.

When rectangular rigid boards are employed, for example, the length of the rigid boards is predetermined so that the respective rigid boards can be arranged within the annular gap. When the annular gap is too narrow for such rigid boards as having a sufficient length to be incorporated therein, the width of the respective rigid boards (the length in the direction of the device axis line) is increased to secure an implementation area of electronic components.

When incorporated into a hollow motor having a different size, the same rigid boards can also be used, and in such a case, flexible printed wiring boards having different lengths are prepared in advance as the conductive members for electrically connecting these rigid boards to one another. There is no need to manufacture rigid boards, in which component parts of the rotation detecting device are implemented, exclusively for each of the different-sized hollow motors, which is advantageous in reducing manufacturing costs of the rotation detecting device.

In the present invention, a plurality of rigid boards can be connected, via connection parts, to form an annular shape in a detachable state. In this case, signal transmission distance among the rigid boards is shortened, which is advantageous in enhancing noise resistance. It is also possible to increase space occupancy of the rigid boards within the annular gap, so that a larger number of rigid boards can be arranged efficiently.

The rotation detecting device of the present invention can be constituted as a magnetic encoder. For example, a magnetic absolute encoder can be constituted by providing a 2-pole magnet ring and a multi-polar magnet ring as the rotational body, the 2-pole and the multi-polar magnet rings being coaxially and adjacently arranged in the direction of the device axis line. In this case, as the detection-element implemented board, a 2-pole-side encoder board and a multipole-side encoder board are arranged, in which a 2-pole-side magnetic detecting elements for detecting rotating magnetic field of the 2-pole magnet ring are implemented in the 2-pole-side encoder board and a multipole-side magnetic detecting elements for detecting rotating magnetic field of the multi-pole magnet ring are implemented in the multipole-side encoder board.

Next, a hollow actuator of the present invention has: a hollow motor; and a rotation detecting device which is incorporated into an outer periphery of a hollow motor shaft of the hollow motor for detecting the rotational state of the hollow motor shaft, wherein the above-constituted rotation detecting device is employed as the rotation detecting device.

BRIEF DESCRIPTION OF THE DRAWINGS

FIGS. 2(a) and 2(b) include a perspective view and an end view, illustrating an arrangement example of rigid boards.

MODE FOR CARRYING OUT THE INVENTION

An embodiment of the present invention is described with reference to the drawings hereinbelow.

Figure 1A:
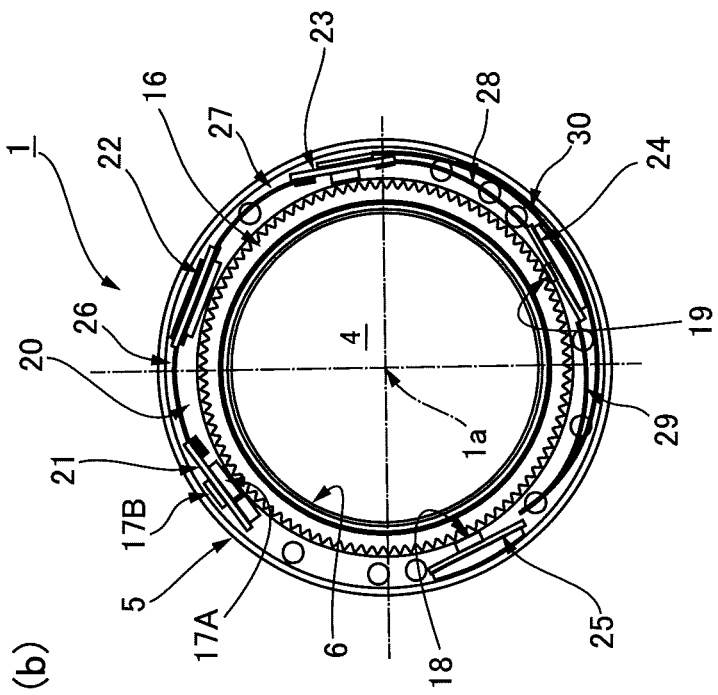
FIGS. 1(a) and 1(b) include a perspective view and an end view, illustrating a hollow motor having a rotation detecting device according to the present invention.
Figure 1B:
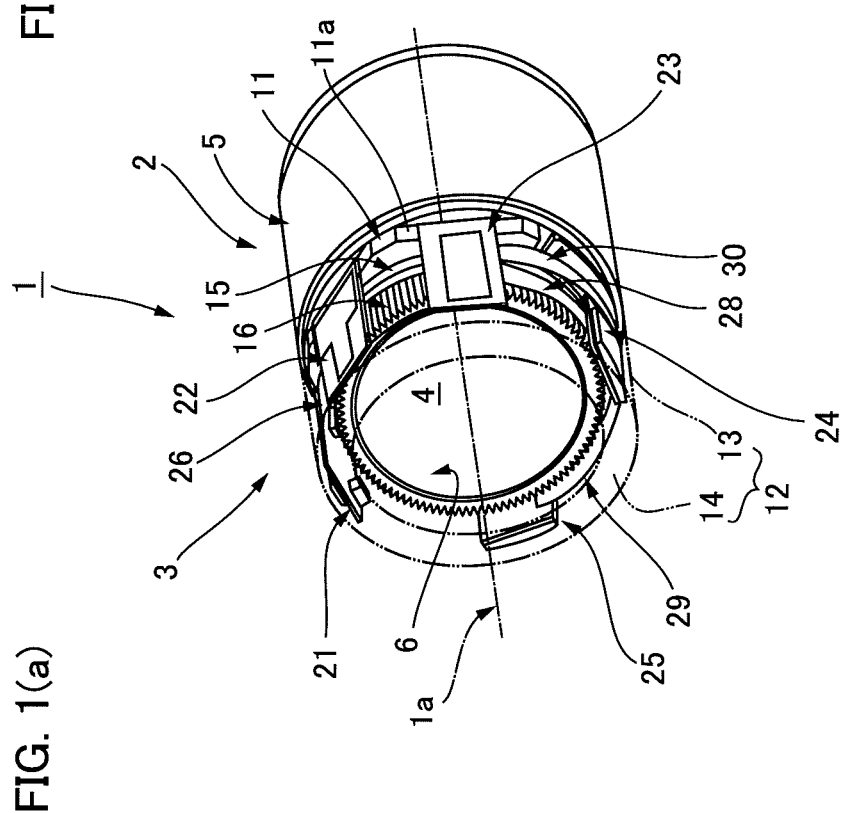

FIG. 1(a) is a perspective view illustrating a hollow motor having a rotation detecting device, which is a hollow actuator according to the present invention, in which the hollow motor is illustrated in a state a device cover being removed from the rotation detecting device. FIG. 1(b) is an end view illustrating the rotation detecting device.

The hollow motor 1 having the rotation detecting device 1 (hereinafter simply referred to as the "hollow motor 1") is provided with a motor main body 2 and the rotation detecting device 3 assembled to one end of the motor main body 2 in the direction of the center axis line 1a thereof, and a hollow part 4 having a circular cross-section extends to pass through the center portions of the motor main body and the rotation detecting device. The motor main body 2 is provided with a circular-contoured motor housing 5 and a hollow motor shaft (not shown) arranged coaxially in the center of the motor housing 5. A motor stator (not shown) is attached to the inner circumferential surface of the motor housing 5 and a motor rotor (not shown) is attached to the outer circumferential surface of the hollow motor shaft.

The rotation detecting device 3 is a hollow-type rotation detecting device having the same outer and inner diameters as those of the motor main body 2 and is assembled coaxially to the rear end (anti-output side portion) of the motor main body 2. The rotation detecting device 3 is also provided with an annular attachment frame 11 coaxially fixed to the rear end of the motor main body 2 and a device cover 12 which is illustrated by imaginary lines and is coaxially attached to the attachment frame 11. The device cover 12 is provided with a cylindrical cover 13 extending coaxially from the attachment frame 11 along the direction of the center axis line 1a and a discoid end cover 14 attached to the rear end of the cylindrical cover 13. The cylindrical cover 13 has an outer diameter which is the same as that of the motor housing 5.

The rotation detecting device 3 of this example is an absolute magnetic encoder and is provided with: a 2-pole magnet ring 15 and a multi-pole gear 16; a pair of 2-pole-side magnetic detecting elements 18 and 19 facing the outer circumferential surface of the 2-pole magnet ring 15 at a constant gap; and a multipole-side magnetic detecting element 17A and a bias magnet 17B, the multipole-side magnetic detecting element facing the outer circumferential surface of the multi-pole gear 16. These component parts are arranged inside the cylindrical cover 13. The multi-pole gear 16 is formed with a plurality of external teeth at a constant interval on the circular outer circumferential surface thereof, the external teeth functioning magnetic poles.

Inside the cylindrical cover 13, a cylindrical shaft end part 6 of the not-shown hollow motor shaft extends in a coaxial state. The 2-pole magnet ring 15 and the multi-pole magnet gear 16, which constitute a rotational body, are attached to the outer circumferential surface of the cylindrical shaft end part 6 so as to integrally rotate therewith. The 2-pole magnet ring 15 is attached at the side of the motor and the multi-pole gear 16 is attached at the side opposite thereto.

There is formed an annular gap 20 between the circular inner circumferential surface of the cylindrical cover 13 and the respective outer circumferential surfaces of the 2-pole magnet ring 15 and the multi-pole gear 16. The motor-side end of the annular gap 20, which is one end thereof in the direction of the center axis line 1a, is closed by the attachment frame 11 and the other end thereof is closed by the end cover 14.

A plurality of rigid boards, five rigid boards 21 to 25 in the illustrated example, are arranged in the annular gape 20 at prescribed intervals along the circumferential direction thereof. The rigid boards 21 to 25 are rectangular-contoured boards and are arranged so that the lengthwise direction thereof is oriented in the tangential direction with respect to the outer circumferential surfaces of the 2-pole magnet ring 15 and the multi-pole gear 16 and the widthwise direction is oriented in the direction of the center axis line 1a. The widthwise end parts of the respective rigid boards 21 to 25 are fixed by screws to the board-attachment outer-circumferential end surface 11a formed on the attachment frame 11. The rigid boards 21 to 25 may have a contour shape other than rectangle and have different contour shapes from one another.

In this example, flexible printed wiring boards 26, 27, 28, 29, 30 are employed as conductive members to electrically connect among the rigid boards 21 to 25. It is possible for the flexible printed wiring boards 26 to 30 to have different length and width from one another. The flexible printed wiring boards having the same width can also be employed.

Electronic components of the rotation detecting device 3 are implemented on both surfaces of the rigid boards 21 to 25. For example, the 2-pole-side magnetic detecting elements 18 and 19 are respectively implemented in the rigid boards 24 and 25, and the multipole-side magnetic detecting element 17A is implemented in the rigid board 21. The 2-pole-side magnetic detecting elements 18 and 19 are arranged at an angular interval of 90 degrees about the center axis line 1a so that one of them outputs an A-phase signal and the other outputs a B-phase signal with one cycle per one rotation of the hollow motor shaft. The multipole-side magnetic detecting element 17A outputs A and B-phase signals with a cycle per one rotation of the hollow motor shaft, the cycle being corresponding to the number of teeth of the gear. Signal processing circuits are implemented, for example, in the rigid boards 22 and 23, and, based on the above signals, generate encoded signals representing the original position, absolute angular positions within one rotation and rotational number (rotational speed) of the hollow motor shaft.

As shown in FIGS. 2(a) and 2(b), the rigid board 21 in which the multipole-side magnetic detecting element 17A is implemented, is arranged at a position apart in the circumferential direction from both the rigid boards 24 and 25 in which the 2-pole-side magnetic detecting elements 18 and 19 are implemented. Thus, the multipole-generating bias magnet 17B implemented in the rigid board 21 is also positioned apart from the 2-pole-side magnetic detecting elements 18 and 19 of the rigid boards 24 and 25. This can make it possible to reduce magnetic interference to the 2-pole side caused by the bias magnet 17B and to realize signal detection with high accuracy.

(Another Example of Rigid Board Arrangement)

Figure 3:
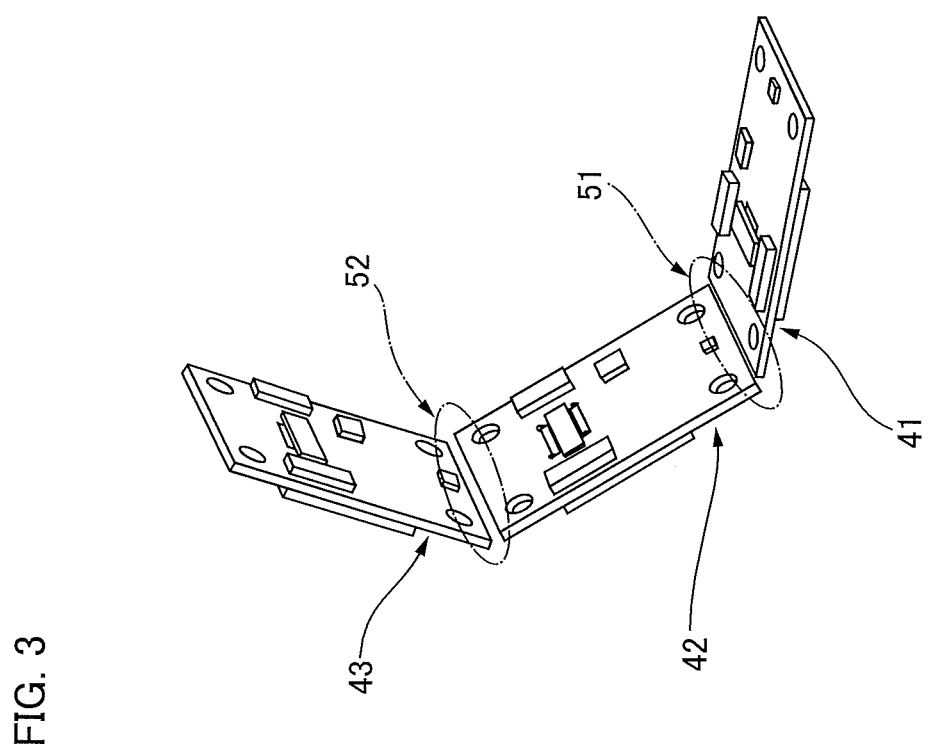
FIG. 3 is an explanatory view illustrating another example of the board arrangement structure of the rotation detecting device according to the present invention.

FIG. 3 is an explanatory view illustrating another example of the arrangement structure of the rigid boards disposed in the annular gap 20. As illustrated in this figure, a plurality of rectangular-contoured rigid boards 41, 42 43 . . . can be connected directly one by one in the circumferential direction without using flexible printed wiring boards or other cables.

Adjacently arranged rigid boards, for example, the rigid boards 41 and 42 can be connected with each other at a prescribed angle by means of a connecting part 51 for detachably connecting therebetween. The attachment portions of the connecting part 51 are indicated by one-dotted line and the detailed structure thereof is omitted in the drawing. The connecting part 51 has a function as a conductive portion for electrically connecting the rigid boards 41 and 42.

As the connecting part 51 to connect the rigid boards 41 and 42, a terminal referred to as a pin header (pin, socket, jumper) can be used, for example. A pin is attached to one rigid board 41 and a socket into which the pin can be inserted is attached to the other rigid board 42. A connecting part 52 having the similar structure is also arranged in the portion indicated by one-dotted line between the rigid boards 42 and 43, and these rigid boards 42 and 43 are connected at a prescribed angle in a detachable state.

In this way, the transmission distance of signals is decreased, so that the noise resistance of electrical circuits implemented in the rigid boards is enhanced. In addition, a number of rigid boards can be arranged in the narrow annular gap without waste space, so that it is possible to utilize the gap efficiently. Furthermore, by changing the connection angle between the rigid boards, the same rigid boards can be applied to a hollow actuator having a different size, which is advantageous in cost.

ANOTHER EMBODIMENT

The above embodiment is a case in which the rotation detecting device is constituted as an absolute magnetic encoder. The rotation detecting device may be constituted as an optical encoder other than a magnetic encoder. A multipole ring magnet may be used instead of the multi-pole gear.

In addition, it is off course that the present invention can be applied to a hollow actuator constituted to have a hollow motor and a hollow speed reducer.

The invention claimed is:

1. A rotation detecting device comprising:
a rotational body coaxially fixed to an outer circumferential surface of a hollow rotational shaft to be detected;
a cylindrical cover surrounding the rotational body;
an annular gap formed between an outer circumferential surface of the rotational body and an inner circumferential surface of the cylindrical cover; and
a plurality of rigid boards arranged in the annular gap along a circumferential direction of the annular gap;
wherein respective pairs of the rigid boards that are arranged adjacently in the circumferential direction are connected to each other at a prescribed angle by means of a connecting part for detachably connecting therebetween,
the connecting part has a function as a conductive portion for electrically connecting the adjacently arranged rigid boards;
the rigid boards are respectively arranged in a state extending along a tangential direction with respect to the outer circumferential surface of the rotational body;
the rigid boards include a plurality of detection-element implemented boards in which detection elements for detecting a rotational state of the rotational body are implemented;
the rotational body has a 2-pole magnet ring and a multi-pole gear that are arranged coaxially and adjacently in a direction of a device axis line, and
the detection-element implemented boards include: a 2-pole-side encoder board in which a 2-pole-side magnetic detection element for detecting a rotating magnetic field of the 2-pole magnet ring is implemented; and a multipole-side encoder board in which a multipole-side magnetic detection element for detecting a rotating magnetic field of the multi-pole gear is implemented.

2. The rotation detecting device according to claim 1, wherein the connecting part has a pin and a socket into which the pin can be inserted, and
the pin is attached to one of the adjacently arranged rigid boards and the socket is attached to the other of the adjacently arranged rigid boards.

3. A hollow actuator comprising:
a hollow motor; and
a rotation detecting device which is assembled to an outer periphery of a hollow motor shaft of the hollow motor to detect a rotational state of the hollow motor shaft,
wherein the rotation detecting device is one that is set forth in claim 1.

4. A rotation detecting device comprising:
a rotational body coaxially fixed to an outer circumferential surface of a hollow rotational shaft to be detected;
a cylindrical cover surrounding the rotational body;

an annular gap formed between an outer circumferential surface of the rotational body and an inner circumferential surface of the cylindrical cover; and a plurality of rigid boards arranged in the annular gap along a circumferential direction of the annular gap;

wherein respective pairs of the rigid boards that are arranged adjacently in the circumferential direction are connected to each other at a prescribed angle by means of a connecting part for detachably connecting therebetween, the connecting part has a function as a conductive portion for electrically connecting the adjacently arranged rigid boards;

the rigid boards are respectively arranged in a state extending along a tangential direction with respect to the outer circumferential surface of the rotational body;

the rigid boards include a plurality of detection-element implemented boards in which detection elements for detecting a rotational state of the rotational body are implemented;

the rotational body has a 2-pole magnet ring and a multi-pole magnet ring that are arranged coaxially and adjacently in a direction of a device axis line, and the detection-element implemented boards include: a 2-pole-side encoder board in which a 2-pole-side magnetic detection element for detecting a rotating magnetic field of the 2-pole magnet ring is implemented; and a multipole-side encoder board in which a multipole-side magnetic detection element for detecting a rotating magnetic field of the multi-pole magnet ring is implemented.

5. The rotation detecting device according to claim 4, wherein the connecting part has a pin and a socket into which the pin can be inserted, and the pin is attached to one of the adjacently arranged rigid boards and the socket is attached to the other of the adjacently arranged rigid boards.

6. A hollow actuator comprising:

a hollow motor; and a rotation detecting device which is assembled to an outer periphery of a hollow motor shaft of the hollow motor to detect a rotational state of the hollow motor shaft, wherein the rotation detecting device is one that is set forth in claim 4.

* * * * *